United States Patent [19]

Franklin et al.

[11] 4,041,136
[45] Aug. 9, 1977

[54] PROCESS FOR THE PRODUCTION OF SILANE

[75] Inventors: Robert E. Franklin, Spotswood, N.J.; Arthur W. Francis, New City, N.Y.; Gregorio Tarancon, Woodbridge, N.J.

[73] Assignee: Union Carbide Corporation, New York, N.Y.

[21] Appl. No.: 726,115

[22] Filed: Sept. 24, 1976

[51] Int. Cl.² .............................................. C01B 33/04
[52] U.S. Cl. ........................... 423/347; 423/DIG. 12; 423/646
[58] Field of Search ................... 423/347, 659, 659 A, 423/646; 204/68, 61

[56] References Cited

U.S. PATENT DOCUMENTS

| | | | |
|---|---|---|---|
| 2,968,544 | 1/1961 | Zeitz et al. | 423/319 X |
| 3,163,590 | 12/1964 | Litz et al. | 204;423/61;347 |
| 3,917,457 | 11/1975 | Bergstrom | 423/320 X |

Primary Examiner—Edward Stern
Attorney, Agent, or Firm—Saul R. Bresch

[57] ABSTRACT

A process for the production of silane in a reaction vessel comprising (i) a single closed chamber, (ii) a hollow tube open at both ends, said tube being disposed in the lower portion of the chamber; and (iii) means for circulating liquid in the lower portion of the chamber in such a manner that the liquid flows in a downward direction through the tube and in an upward direction outside of the tube comprising the following steps:
a. maintaining a melt of lithium chloride in the lower portion of the chamber, the level of the melt being above the tube;
b. activating the circulating means;
c. introducing liquid lithium into the melt in such a manner that at least a part thereof is brought to the surface of the melt;
d. introducing hydrogen gas above the surface of the melt in such a manner that hydrogen gas reacts with lithium at the surface of the melt to form lithium hydride,
   the lithium, lithium hydride, and melt being admixed by the circulating means to provide a homogeneous mixture thereof;
e. introducing, as a gas, a compound or a mixture of compounds having the formula $$SiH_xCl_{4-x}$$

wherein
x is 0 or an integer from 1 to 3
in such a manner that the gas is dispersed by the circulating means into the mixture whereby the gas contacts the lithium hydride to form silane gas; and
f. removing the silane gas from the chamber.

12 Claims, 1 Drawing Figure

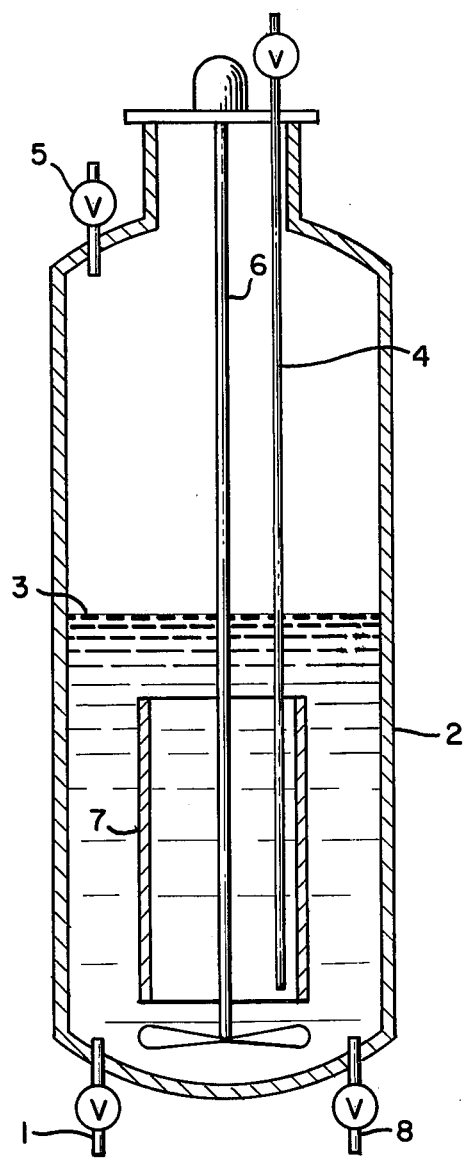

4,041,136

PROCESS FOR THE PRODUCTION OF SILANE

FIELD OF THE INVENTION

This invention relates to an improvement in a process for the production of silane and, more particularly, to a process for the production of silane in a single chamber.

DESCRIPTION OF THE PRIOR ART

Silane ($SiH_4$) or silicon hydride is an excellent source for electronic grade silicon, the prerequisite for which is very high purity.

Heretofore, continuous processes were used to produce silane in which two reaction chambers in combination with an electrolytic cell were required to obtain the silane. Because the reactions in the different chambers and cell proceed at varying rates, the flow rates or circulation rates were limited in the continuous operation by the slowest reaction unless the penalty of high losses, e.g., of lithium hydride, was accepted. Together with the problem of flow rates, the amount of equipment, its sizing, stream splitting, and system control contributed to make the continuous process a good deal less than optimum, but a viable alternative has until now proved elusive.

SUMMARY OF THE INVENTION

An object of this invention, therefore, is to provide a process for the production of silane, which can be conducted in a single chamber, i.e., in batch or semi-continuous form, independent of the electrolytic cell thus freeing the precess from the flow rate requirements imposed by the continuous process, simplifying the control of the system, reducing the amount of equipment, and eliminating sizing problems.

Other objects and advantages will become apparent hereinafter.

According to the present invention such a single chambered process for the production of silane has been discovered, the process being carried out in a reaction vessel comprising (i) a single closed chamber, (ii) a hollow tube open at both ends and having a theoretical axis running from end to end which axis is about parallel to the theoretical vertical axis of the chamber, said tube being disposed in the lower portion of the chamber; and (iii) means for circulating liquid in the lower portion of the chamber in such a manner that the liquid flows in a downward direction through the tube and in an upward direction outside of the tube comprising the following steps:

a. maintaining a melt of lithium chloride in the lower portion of the chamber, the level of the melt being above the tube;

b. activating the circulating means;

c. introducing liquid lithium into the melt in such a manner that at least a part thereof is brought to the surface of the melt;

d. introducing hydrogen gas above the surface of the melt in such a manner that hydrogen gas reacts with lithium at the surface of the melt to form lithium hydride, the lithium, lithium hydride, and melt being admixed by the circulating means to provide a homogeneous mixture thereof;

e. introducing as a gas, a compound or a mixture of compounds having the formula $SiH_xCl_{4-x}$ wherein x is 0 or an integer from 1 to 3 in such a manner that the gas is dispersed by the circulating means into the mixture whereby the gas contacts the lithium hydride to form silane gas; and f. removing the silane gas from the chamber.

BRIEF DESCRIPTION OF THE DRAWING

The sole FIGURE is a schematic side view cross-section of a single chambered reactor in which the basic process may be carried out.

DESCRIPTION OF THE PREFERRED EMBODIMENT

The reactor, piping, valves, tube, and rotor can be made from any of various materials inert to the reactants and resistant to the corrosive action of molten salt, the preferred material being low carbon steel (containing from 0.03 to 0.3 percent by weight carbon).

The size of the reactor and the various fittings can be decided upon conventional lines and are not critical to the invention. Capacity, temperatures, pressures, longevity, economics and available materials should be considered when making the decision as well as the requirement that the single chamber of the reactor be "closed", i.e., it should be air tight so that essentially no air or water vapor gets into the reactor, to provide a reaction environment which is substantially air-free and anhydrous. The use of a closed reactor and reaction components having a minimum of impurities will, in turn, yield a silane having minimal amounts of impurities, which will not overburden a purification system.

The main parts of the reactor are single closed chamber; a hollow tube open at both ends and having a theoretical axis running from end to end which axis is about parallel to the theoretical vertical axis of the chamber, said tube being disposed in the lower portion of the chamber; and means for circulating liquid in the lower portion of the chamber in such a manner that the liquid flows in a downward direction through the tube and in an upward direction outside of the tube.

Referring to the drawing:

The single closed chamber is referred to as reactor 2. There are intake ports, exit ports, and lines which pass through the walls of reactor 1 and are controlled by valves. It is understood that these ports and lines are connected to sources and reservoirs or other vessels in such a manner so as to maintain the integrity of the reaction environment, i.e., essentially free from air and essentially in an anhydrous condition. Setting up such a closed system is conventional and will not be discussed here.

Although the dimensions of reactor 2 can be varied, it is preferably in a cylindrical shape, its longest dimension residing in a vertical position as shown. The dimensions of tube 7 can also be varied as well as the location of tube 7 and agitator 6 as long as the required circulation can be obtained. Tube 7 preferably, however, has a cylindrical shape as shown with opposite open ends, the longest dimension of the tube being in a vertical position, and is disposed in the lower half or lower portion of reactor 2 preferably centrally. The drive shaft of agitator 6 is preferably in the position of the theoretical vertical axes of both reactor 2 and tube 7, again as shown. While it is not required that the theoretical axes be the same or even parallel, a divergence from the parallel of 10° or more may affect the flow and so is not suggested. Disposition, centrally or otherwise in the lower half of the reactor is also not of a critical nature, but the lower the position of the tube, the lower the level of the melt can be since the tube must be beneath the surface of the melt if agitator 6 and tube 7 are to control the flow of the melt.

The main parts of agitator 6 are the motor, the drive shaft, and a rotor with blades positioned in such a manner that lithium, lithium hydride, and melt above the tube will be drawn down into and through the tube in circular fashion and pushed and/or pulled outside of the tube to provide circulation together with mixing the various components. A typical agitator has a 14½ inch marine blade propeller and is driven by a 3½ horsepower motor at variable speeds up to 360 revolutions per minute (rpm). The agitator is also used in temperature control and the rpm are adjusted accordingly when higher or lower temperatures are desired.

Initially, lithium chloride is introduced in a molten form at intake port 1 in a sufficient amount to reach level 3 shown by a heavy broken line. As pointed out above, the level of the melt must be above the tube if the desired circulation is to be provided by the tube and agitator. Preferably, the lithium halide is mixed with potassium chloride to bring down the temperature needed to maintain the melt. Most preferred is a eutectic mixture which contains about 59 mole percent lithium chloride and about 41 mole percent potassium chloride. This eutectic mixture requires a temperature of about 350° C to maintain it in a molten state. It is advantageous to use the lowest temperature sufficient to maintain the melt since this minimizes the decomposition of the silane product.

It will be understood by those skilled in the art that either lithium chloride or potassium chloride or a mixture containing from about 1 to about 99 mole percent lithium chloride and from about 1 to about 99 mole percent potassium chloride can be used; however, the farther away from the eutectic mixture one goes, in the case of lithium chloride, the higher the temperature required for the melt and thus the greater the silane decomposition since lithium chloride per se melts at 614° C. Although potassium chloride could serve as the reaction medium, it does not, of course, provide the necessary lithium. It is, therefore, introduced primarily as a flux, i.e., to lower the temperature necessary to maintain a lithium chloride melt. While, as noted, it would be preferred to use the eutectic mixture from a strictly temperature point of view, it is found to be most practical to increase the lithium chloride to amounts where there is sufficient lithium chloride to provide the required lithium, makeup lithium chloride is minimized, and the temperature required to maintain the melt will not decompose the silane above economically acceptable levels. This contemplates a mixture of about 52 to about 68 mole percent lithium chloride and about 32 to about 48 mole percent potassium chloride, which is most useful at a melt temperature of about 425° C. Optimum mixtures for different temperatures can be selected by the operator on the basis of experience.

At this point, the use of outside heating (not shown) is availed of to maintain the melt. The lowest temperature sufficient to maintain the eutectic mixture as a melt is about 350° C. The most practical temperatures are in the range of about 375° to about 525°. Until the silane is formed, there is no upper temperature limit except the limit of practicality.

Lithium metal in liquid form is introduced into reactor 2 together with the lithium chloride through intake port 1 or separately at some other point in reactor 2. At the same time hydrogen gas is introduced at port 5 or at some other point in reactor 2 above the level of the melt filling the portion of the chamber above the melt. The lithium metal rises to the top or surface of the melt and a part of it is brought to the surface of the melt at all times by the circulating means used in the system so that it will be in position to contact and react with the hydrogen. The hydrogen is under sufficient pressure so that it will contact lithium metal on the surface of the melt and here the first reaction of the process takes place:

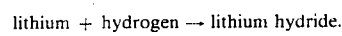
lithium + hydrogen → lithium hydride.

Simultaneously with the introduction of the lithium and the hydrogen or before they are introduced, agitator 6 is put into operation. Vigorous agitation is recommended. The agitator takes melt, lithium metal, and lithium hydride and draws these components downward into tube 7, and at the same time mixes the components to provide a homogeneous mixture. It is noted that the homogeneous mixture of lithium hydride in melt is considered to be a solution. The mixture then passes by a circular flow in an upward direction outside of tube 7 returning lithium metal to the surface of the melt to contact the hydrogen.

The advantages found in the precess as described up to this point are even heat distribution throughout the melt; the prevention of the formation of lumps of lithium hydride; the enhancement of the rate of solubility, i.e., the components proceed quickly to a homogeneous solution of lithium hydride in melt; the cleaning of the lithium metal to enhance its reaction with hydrogen; and the completion of the lithium-hydrogen reaction at a rapid rate and at a significantly low temperature.

The next step, referred to above as step (e), is the introduction, in gaseous form, of a compound or a mixture of compounds having the formulas:

$SiH_xCl_{4-x}$ wherein x is 0 or an integer from 1 to 3, at a location, preferably the lower portion or lower half of tube 7, and at sufficient pressure for the gas to bubble into the melt and impinge on the blade of agitator 6, which is designed to provide a good dispersion of the bubbles throughout the melt outside of tube 7 thus increasing the contact between the gas and the lithium hydride. The pressure suggested here is about 1 to about 10 psi. This contact results in an exothermic reaction, e.g., tetrachlorosilane + lithium hydride → silane gas + lithium chloride. It will be noted that the above formula for chlorosilane includes monochlorosilane, dichlorosilane, trichlorosilane, and tetrachlorosilane of which the latter two are preferred. Although mixtures can be used, it is usual to use a single chlorosilane compound.

Since this step is exothermic, no heating is supplied and agitation is increased and/or external cooling is provided to maintain the same low temperature used in the prior steps. Here, the temperature is in the range of about 375° to about 425° C and these temperatures are preferred. The upper temperature limit is determined on the bases of how much silane decomposition is economically acceptable, usually not greater than about 500° C.

The process, heretofore described, is preferably used as part of a semi-continuous system in which, for example, there are two reactors and one electrolytic cell, which provides the lithium. In this case, one reactor is always empty and the electrolytic cell services both reactors. It appears, however, that the most economical arrangement is to use two reactors and two electrolytic cells in which case the melt is always in three of the vessels, the fourth always being empty. This sequential system will be described later on, but it will be clear that the use of the residual melt (after the silane is removed) in further processing would be objectionable from a purity point of view unless it was cleaned up. Objectionable components at this stage are (1) silicon formed from the decomposition of silane, which, of course, is minimized by the use of the lowest temperature required to maintain the solution of lithium hydride in the melt and (2) unreacted lithium hydride. A feature of this invention, which may be called salt cleaning, provides just such a clean-up in the following additional step:

g. introducing hydrogen chloride gas into the melt in sufficient amount to react with the unreacted lithium hydride and silicon to form a chlorosilane gas, lithium chloride, and hydrogen gas.

This step is accomplished preferably by introducing the hydrogen chloride gas through line 4 into the lower portion of tube 7 where it is drawn into a area of great turbulence which aids in dissolving the hydrogen chloride in the melt thus enhancing the reaction and minimizing the amount of hydrogen chloride required to accomplish the task of reacting with the unreacted lithium hydride and silicon. The hydrogen chloride can be introduced at other points in the melt, but this is considered less efficient.

The final step in the basic process, referred to above as step (f), removes the silane gas through port 5, and where step (g) is used, another step, step (h), removes chlorosilane gas and hydrogen gas through port 5 as the gases are produced. The gases can be removed through the same port or different ports, which can be located anywhere above the melt level, preferably close to the top of reactor 2. The silane gas proceeds to storage or purification and the other gases can be used in the process depending on the economics then obtaining. Any purification or separation used here can be conventional and such techniques will not be described.

Exit port 8 is provided for transfers of melt to an electrolytic cell where reactor 2 is integrated into a total system. Intake port 1 also serves the function of being available for transfers from an electrolytic cell in the same case.

The process described heretofore contemplates the use of a sufficient amount of melt to cover the tube and a sufficient amount of lithium, hydrogen, chlorosilane, and hydrogen chloride to produce the desired amount of silane and essentially remove unreacted lithium hydride and silicon. To achieve greater efficiencies, however, the following molar ratios are suggested. These ratios are based on the use of one mole of a mixture of lithium chloride and potassium chloride, the proportions of the mixture having been dealt with heretofore (in the case of lithium it will be understood that the ratio is given in terms of gram atoms of lithium per mole of LiCl + KCl):

i. about 0.01 to about 0.1 gram atoms of lithium per mole of Li + KCl and, preferably, about 0.07 to about 0.08 gram atoms of lithium per mole;

ii. about 0.01 to about 0.05 moles of hydrogen per mole of LiCl + KCl and, preferably, about 0.03 to about 0.04 moles of hydrogen per mole;

iii. about 0.005 to about 0.025 moles of $SiCL_4$ per mole of LiCl + KCl and, preferably, about 0.01 to about 0.02 moles of $SiCL_4$ per mole;

iv. about 0.003 to about 0.0045 moles of hydrogen chloride per mole of LiCl + KCl and, preferably, about 0.0035 to about 0.0037 moles of hydrogen chloride per mole (based on 5% $SiH_4$ decomposition).

Make-up lithium chloride and/or potassium chloride can always be introduced where needed to meet process requirements.

The electrolytic cells used in the system mentioned above can be those of conventional construction using the same materials as for reactor 2, i.e., inert and corrosion resistant. A preferred cell has a graphite anode in the center surrounded by a low carbon steel cathode and is devoid of the usual ceramic liner. Necessary piping and valves are provided to connect it to the system and a chlorine gas exit port is provided, preferably at the top of the cell, but, in any case, above the melt level. The main reaction in the cell is as follows:

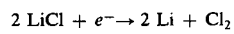

$$2\ LiCl\ +\ e^- \rightarrow 2\ Li\ +\ Cl_2$$

The chlorine gas is collected and generally sold as is. Sufficient heat is provided to maintain the melt which is the medium used throughout the process. All of the lithium chloride does not, of course, undergo reaction here, but only a sufficient amount to provide the lithium needed for the basic process in the reactors.

The preferred system is comprised of two reactors such as reactor 2 and two electrolytic cells, the sizing of the vessels and the piping being determined by the amounts of materials to be processed and the desired flow rates.

Sequentially, the first reactor discharges its residual melt into the first electrolytic cell which discharges into the second reactor. The second reactor discharges into the second electrolytic cell, which discharges into the first reactor to complete the cycle.

In this preferred system, melt is always present in three of the four vessels, the fourth being empty. Melt and lithium metal are transferred from a cell to a reactor, e.g., approximately every 12 hours. Electrolysis occurs on a nearly continuous bases while the basic process plus salt cleaning occurs only once in each reactor in, e.g., each 24 hour period. This sequential system is controlled by simply shutting the connecting valves during transfer of melt. Just as sizing depends on the amount of product and flow rates desired so also does the timing, which can suitably be lengthened or shortened to accommodate silane requirements.

The invention described above is illustrated by the following example:

EXAMPLE

The process as described above is carried out in the preferred manner for 24 hours. Two reactors, 8 feet high by 3 feet in diameter, and two electrolytic cells, 9 feet high by 3 feet in diameter, are connected in sequence (or series) described above. The material used in constructing the reactors and the cells is low carbon steel and the cells have a graphite anode, low carbon steel cathode, and no liner. The chlorosilane reactant is tetrachlorosilane. The process steps, including salt cleaning, are carried out in each reactor once in the 24 hour period. Electrolysis is continuous, at least one cell always being in operation. The total heat added to maintain the melt in the cells is 183,600 BTU's per 24 hours and in the reactors, 1,239,300 BTU's per 24 hours. The process is carried out in each reactor in 10 hours. 110 pounds of silane are recovered from the system in the 24 hours (two cycles).

The reactors are operated at a temperature of about 400° C and the cells are operated at a temperature of about 450° C.

To obtain the resultant silane, the amounts of each component used in moles based on a total of one mole in the system are as follows:

|  | mole |
| --- | --- |
| potassium chloride | 0.1827 |
| lithium chloride | 0.2673 |
| lithium | 0.072 (gram atom) |
| hydrogen | 0.036 |
| tetrachlorosilane | 0.018 |
| hydrogen chloride | 0.004 |

The mole percent in the initial melt mixture introduced into the reactor is 40.6 mole percent potassium chloride and 59.40 mole percent lithium chloride.

The silane gas recovered is at least about 98 percent by weight silane, the balance of the 100 weight percent being impurities, and may be sent to a silane purification system.

We claim:

1. A process for the production of silane in a reaction vessel comprising
   i. a single closed chamber,
   ii. a hollow tube open at both ends and having a theoretical axis running from end to end which axis is about parallel to the theoretical vertical axis of the chamber, said tube being disposed in the lower portion of the chamber; and
   iii. means for circulating liquid in the lower portion of the chamber in such a manner that the liquid flows in a downward direction through the tube and in an upward direction outside of the tube
comprising the following steps:
   a. maintaining a melt of lithium chloride in the lower portion of the chamber, the level of the melt being above the tube;
   b. activating the circulating means;
   c. introducing liquid lithium into the melt in such a manner that at least a part thereof is brought to the surface of the melt;
   d. introducing hydrogen gas above the surface of the melt in such a manner that hydrogen gas reacts with lithium at the surface of the melt to form lithium hydride,
   the lithium, lithium hydride, and melt being admixed by the circulating means to provide a homogeneous mixture thereof;
   e. introducing, as a gas, a compound or a mixture of compounds having the formula

$SiH_xCl_{4-x}$ wherein
   $x$ is 0 or an integer from 1 to 3
   in such a manner that the gas is dispersed by the circulating means into the mixture whereby the gas contacts the lithium hydride to form silane gas; and
   f. removing the silane gas from the chamber.

2. The process defined in claim 1 wherein the following steps are carried out after step (e) where there is present, in addition to silane gas, unreacted lithium hydride and silicon:
   g. introducing hydrogen chloride gas into the melt in sufficient amount to react with unreacted lithium hydride and silicon to form a chlorosilane gas, lithium halide, and hydrogen; and
   h. removing the chlorosilane gas and hydrogen gas from the chamber.

3. The process defined in claim 1 wherein the melt contains potassium chloride as a flux.

4. The process defined in claim 2 wherein the melt contains potassium chloride as a flux.

5. The process defined in claim 3 wherein the following components are introduced in the following proportions:
   i. about 0.01 to about 0.1 gram atom of lithium per mole of mixture of lithium chloride and potassium chloride;
   ii. about 0.01 to about 0.05 mole of hydrogen per mole of mixture of lithium chloride and potassium chloride; and
   iii. about 0.005 to about 0.025 mole of tetrachlorosilane per mole of mixture of lithium chloride and potassium chloride.

6. The process defined in claim 4 wherein the following components are introduced in the following proportions:
   i. about 0.07 to about 0.08 gram atom of lithium per mole of mixture of lithium chloride and potassium chloride;
   ii. about 0.01 to about 0.05 mole of hydrogen per mole of mixture of lithium chloride and potassium chloride;
   iii. about 0.01 to about 0.02 mole of tetrachlorosilane per mole of mixture of lithium chloride and potassium chloride; and
   iv. about 0.003 to about 0.0045 moles of hydrogen chloride permole of mixture of lithium chloride and potassium chloride.

7. The process defined in claim 5 wherein the melt contains a eutectic mixture of lithium chloride and potassium chloride or a mixture of about 52 to about 68 mole percent lithium chloride and about 32 to about 48 mole percent potassium chloride.

8. The process defined in claim 6 wherein the melt contains a eutectic mixture of lithium chloride and potassium chloride or a mixture of about 52 to about 68 mole percent lithium chloride and about 32 to about 48 mole percent by weight potassium chloride.

9. The process defined in claim 6 wherein the temperature maintained in steps (a), (b), (c), and (d) is in the range of about 375° to about 525° C and the temperature maintained in step (e) and until the silane is removed from the chamber is in the range of about 375° to about 425° C.

10. The process defined in claim 4 wherein the chlorosilane compound is trichlorosilane or tetrachlorosilane.

11. The process defined in claim 9 wherein the reaction vessel is integrated into a semi-continuous system comprising at least one reaction vessel and at least one electrolytic cell connected in series wherein the melt is used as a medium in vessel and cell, lithium for the process is produced by electrolysis of the lithium chloride in the cell, and the vessel is periodically emptied.

12. The process defined in claim 11 wherein there are at least one pair of vessels and one pair of cells and each of the pair of vessels alternates at being emptied.

* * * * *